US012764271B2

(12) United States Patent
Xia et al.

(10) Patent No.: US 12,764,271 B2
(45) Date of Patent: Oct. 13, 2026

(54) METHOD AND DEVICE FOR CORRECTING MICRO POLYCHROME LIGHT EMITTING DEVICE

(71) Applicant: Hue Inc., Shanghai (CN)

(72) Inventors: Zhouhui Xia, Shanghai (CN); Jing Ju, Shanghai (CN); Xuan Zhang, Shanghai (CN); Shuai Zhang, Shanghai (CN)

(73) Assignee: Hue Inc., Shanghai (CN)

( * ) Notice: Subject to any disclaimer, the term of this patent is extended or adjusted under 35 U.S.C. 154(b) by 0 days.

(21) Appl. No.: 19/097,891

(22) Filed: Apr. 2, 2025

(65) Prior Publication Data

US 2025/0310505 A1 Oct. 2, 2025

(51) Int. Cl.

*H04N 13/327* (2018.01)
*H04N 13/167* (2018.01)
*H04N 13/344* (2018.01)
*H04N 13/398* (2018.01)
*H04N 13/00* (2018.01)

(52) U.S. Cl.

CPC ......... *H04N 13/327* (2018.05); *H04N 13/167* (2018.05); *H04N 13/344* (2018.05); *H04N 13/398* (2018.05); *H04N 2013/0092* (2013.01)

(58) Field of Classification Search

CPC .. H04N 13/327; H04N 13/167; H04N 13/344; H04N 13/398; H04N 2013/0092; G02B 27/0068; G02B 2027/0112; G02B 2027/0178; G02B 27/0172; G02B 27/149; G02B 2027/0114; G02B 27/0176

See application file for complete search history.

(56) References Cited

U.S. PATENT DOCUMENTS 10,965,931 B1 * 3/2021 Ryuma ................. H04N 13/271
2015/0350588 A1 * 12/2015 Lim ..................... H04N 9/3194
348/745

(Continued)

FOREIGN PATENT DOCUMENTS

CN 102591531 A 7/2012
CN 109104597 A 12/2018

(Continued)

OTHER PUBLICATIONS

International Search Report and Written Opinion of PCT application No. PCT/CN2024/085470, dated Dec. 19, 2024.

*Primary Examiner* — Alazar Tilahun

(74) *Attorney, Agent, or Firm* — FINNEGAN, HENDERSON, FARABOW, GARRETT & DUNNER LLP

(57) ABSTRACT

Embodiments of the present disclosure provide a method for correcting a micro polychrome light emitting device, including: obtaining a rotational compensation between a first display and a second display of the micro polychrome light emitting device, a first image rendered by the first display being rotatable according to the rotational compensation to align with a second image rendered by the second display; determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

50 Claims, 17 Drawing Sheets

(56) References Cited

U.S. PATENT DOCUMENTS

| | | | | |
|---|---|---|---|---|
| 2020/0018968 | A1* | 1/2020 | Edwin .................. | G02B 6/0015 |
| 2022/0058997 | A1* | 2/2022 | Buckley .................... | G09G 3/32 |
| 2023/0217001 | A1* | 7/2023 | Holzer ................. | H04N 13/117 |
| | | | | 348/36 |
| 2023/0273435 | A1* | 8/2023 | Schultz ..................... | G09G 3/32 |
| | | | | 359/630 |
| 2023/0393454 | A1* | 12/2023 | Zhang ................ | G03B 21/2033 |

FOREIGN PATENT DOCUMENTS

| | | | |
|---|---|---|---|
| CN | 115660935 | A | 1/2023 |
| CN | 116072026 | A | 5/2023 |
| JP | 2004198650 | A | 7/2004 |
| JP | 2007271771 | A | 10/2007 |
| JP | 2014186104 | A | 10/2014 |

* cited by examiner

330

320

310

1602

1601

METHOD AND DEVICE FOR CORRECTING MICRO POLYCHROME LIGHT EMITTING DEVICE

CROSS-REFERENCE TO RELATED APPLICATIONS

This disclosure claims the benefits of priority to PCT Application No. PCT/CN2024/085470, filed on Apr. 2, 2024, which is incorporated herein by reference in its entirety.

TECHNICAL FIELD

The present disclosure generally relates to near-eye display technology, and more particularly, to a method and a system for correcting a micro polychrome light emitting device.

BACKGROUND

A micro polychrome light emitting device implemented in a near eye display (NED) is also known as a micro-LED light engine (also referred to as LED light engine) that includes three micro-LED displays, each emitting a distinct color of light. The micro-LED light engine utilizes a tri-color projection scheme with three monochromatic displays. The final image is merged with color-separated pictures. Traditional assembly methods may accumulate processing parts and curing processes, resulting in deviation between the three displays and leading to color casts and edge distortions in the imaging.

Therefore, there is a need for solving the physical displacement issues associated with multiple light-emitting units during assembly of a micro polychrome light emitting device to address these alignment issues.

SUMMARY OF THE DISCLOSURE

Embodiments of the present disclosure provide a method for correcting a micro polychrome light emitting device. The method includes: obtaining a rotational compensation between a first display and a second display of the micro polychrome light emitting device, a first image rendered by the first display being rotatable according to the rotational compensation to align with a second image rendered by the second display; determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

Embodiments of the present disclosure provide a method for correcting a micro polychrome light emitting device. The method includes: determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a corresponding plurality of candidate shift compensation schemes, wherein the plurality of candidate regional segmentation schemes and the plurality of candidate shift compensation schemes are retrievable from a look-up table with the rotational compensation as an entry, respectively, and wherein each region of the first image segmented based on a retrieved regional segmentation scheme is shiftable according to a retrieved shift compensation scheme to correct a rotational offset between the first display and the second display.

Embodiments of the present disclosure provide a micro polychrome light emitting device. The micro polychrome light emitting device includes: a memory configured to store a rotational compensation and a set of instructions; and one or more processors configured to execute the set of instructions to cause the micro polychrome light emitting device to perform operations including: obtaining a rotational compensation between a first display and a second display of the micro polychrome light emitting device, a first image rendered by the first display being rotatable according to the rotational compensation to align with a second image rendered by the second display; determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

Embodiments of the present disclosure provide a device for correcting a micro polychrome light emitting device. The device includes: a memory configured to store a set of instructions; and one or more processors configured to execute the set of instructions to cause the device to perform operations including: determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a corresponding plurality of candidate shift compensation schemes, wherein the plurality of candidate regional segmentation schemes and the plurality of candidate shift compensation schemes are retrievable from a look-up table with the rotational compensation as an entry, respectively, and wherein each region of the first image segmented based on a retrieved regional segmentation scheme is shiftable according to a retrieved shift compensation scheme to correct a rotational offset between the first display and the second display.

Embodiments of the present disclosure provide a non-transitory computer-readable storage medium storing a set of instructions that are executable by one or more processors of a device to cause the device to perform operations for correcting a micro polychrome light emitting device, the operations including: obtaining a rotational compensation between a first display and a second display of the micro polychrome light emitting device, a first image rendered by the first display being rotatable according to the rotational compensation to align with a second image rendered by the second display; determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

Embodiments of the present disclosure provide a non-transitory computer-readable storage medium storing a set of instructions that are executable by one or more processors of a device to cause the device to perform operations for correcting a micro polychrome light emitting device, the operations including: determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a corresponding plurality of candidate shift compensation schemes, wherein the plurality of candidate regional segmentation schemes and the plurality of candidate shift compensation schemes are retrievable from a look-up table with the rotational compensation as an entry, respectively, and wherein each region of the first image segmented based on a retrieved regional segmentation scheme is shiftable according to a retrieved shift compensation scheme to correct a rotational offset between the first display and the second display.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Figure 1:
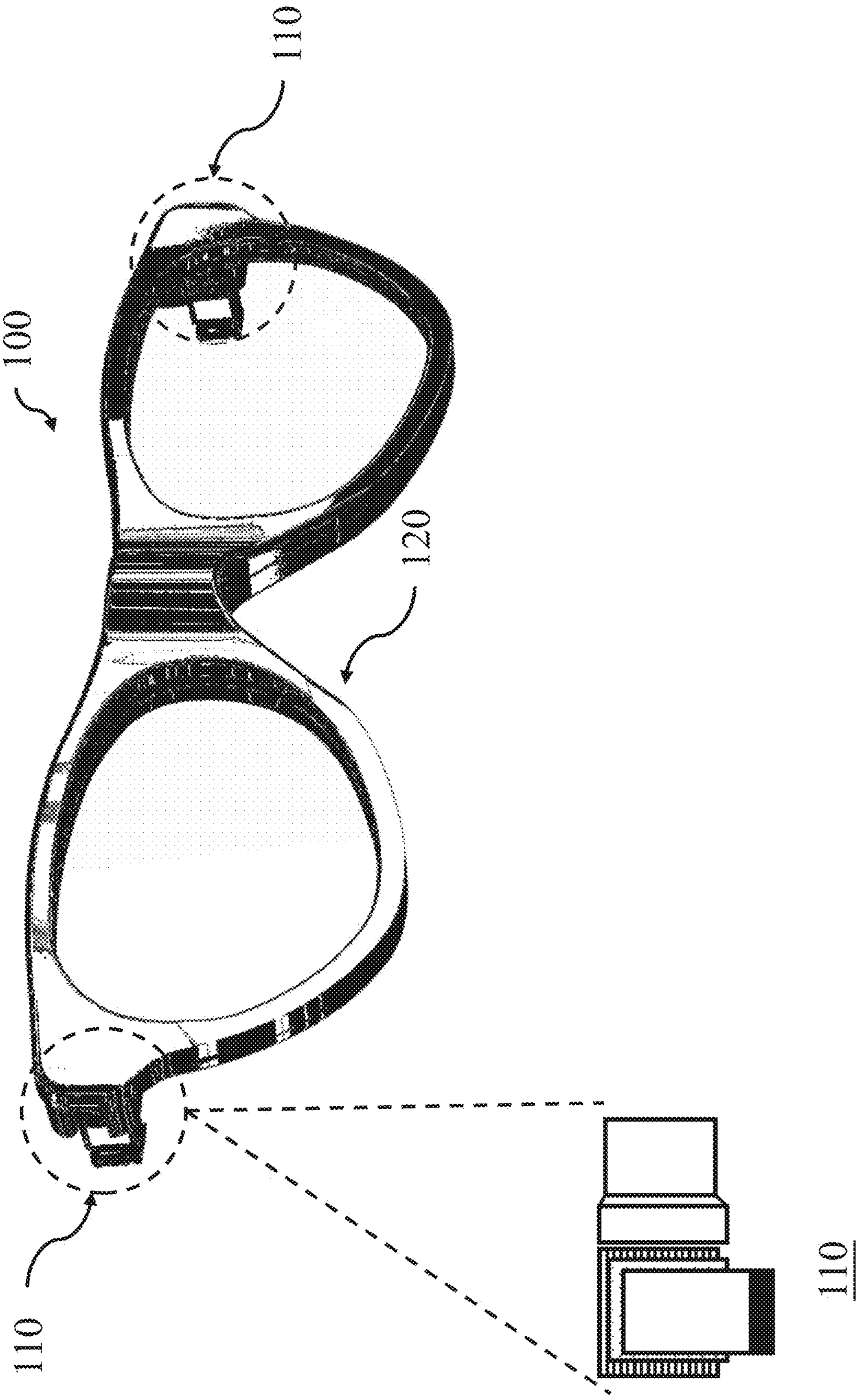
FIG. 1 is a schematic diagram of an exemplary NED, according to some embodiments of the present disclosure.

FIG. 1 is a schematic diagram of an exemplary NED 100, according to some embodiments of the present disclosure. As shown in FIG. 1, NED 100, for example AR glasses, includes a pair of micro polychrome light emitting devices, e.g., polychrome projectors 110, and a frame 120 for securing polychrome projectors 110. NED 100 may also include other components which are omitted here for the purpose of clearly illustrating the configuration of NED 100. Each polychrome projector 110 can be arranged at an end of a temple (not shown) of NED 100, respectively. A power system and a processing system to drive polychrome projectors 110 can be embedded in the temple. Images rendered by each polychrome projector 110 can be captured by respective eyes of a viewer (not shown), which can be used to create a virtual scene or an augmented scene for the viewer. In some embodiments, the term "render" may also be referred to as "display," "show" or an equivalent.

Figure 2:
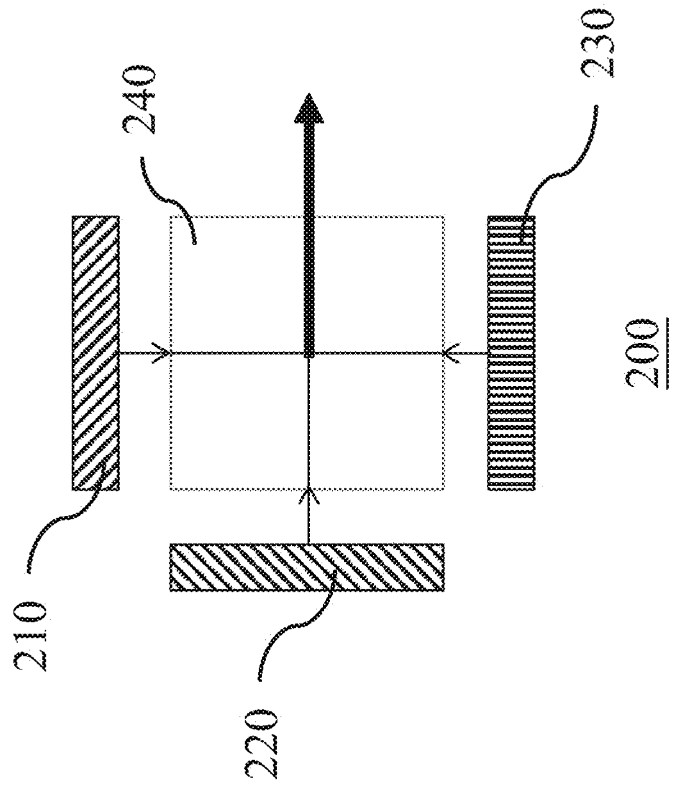
FIG. 2 is a schematic diagram of an exemplary polychrome projector, according to some embodiments of the present disclosure.

FIG. 2 is a schematic diagram of an exemplary polychrome projector 200 according to some embodiments of the present disclosure. Referring to FIG. 2, polychrome projector 200 includes a first display 210, a second display 220, a third display 230, and a combiner 240 (e.g., a combining prism). Combiner 240 can be used to combine (also referred to as "compositing") the images rendered by first display 210, second display 220, and third display 230 to a composite one. As appreciated, polychrome projector 200 may also include other necessary components for operation that are omitted here.

In some examples, first display 210 is used to display red components of a composite image, second display 220 is used to display green components of the composite image, and third display 230 is used to display blue components of the composite image. That is, first display 210 renders a red image, second display 220 renders a green image, and third display 230 renders a blue image, which can be composited through combiner 240 to form a polychrome image.

In an ideal scenario, the red image, the green image, and the blue image are precisely aligned after passing through combiner 240. As previously noted, inherent flaws in the manufacturing and assembling process may result in the misplacement of first display 210, second display 220, or third display 230 from their intended positions. Consequently, the combination of the red image, the green image, and the blue image via combiner 240 may exhibit a slight displacement or rotational offset, perceptible to the observer.

Figure 3:
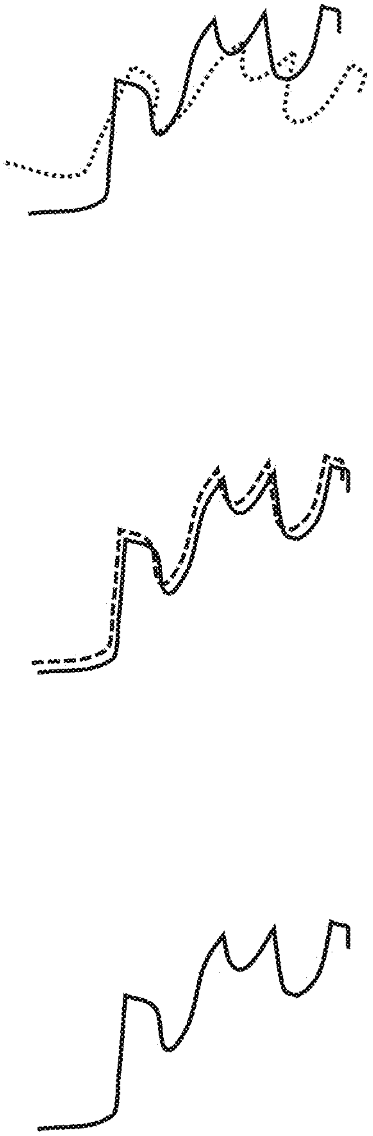
FIG. 3 is a schematic diagram illustrating dislocation between images, according to some embodiments of the present disclosure.

FIG. 3 is a schematic diagram illustrating dislocation between images, according to some embodiments of the present disclosure. For illustrative purposes, only two constituent components of a composite image are depicted in FIG. 3. As shown in FIG. 3, composite images 310, 320, and 330 are illustrated as composited by curves of two different components, wherein one curve is represented by a solid line and the other curve is represented by a dashed line. For example, composite image 310 is composited by curves of two different components that are seamlessly aligned, therefore the stored image is rendered with a highly accurate depiction. Composite image 320 is composited by curves of two different components that are slightly displaced from each other. As a consequence, there is a likelihood of color casts and color edges occurring, thereby degrading the overall imaging quality. Composite image 330 is composited by curves of two different components that are rotated from each other, thus composite image 330 may suffer from the same problem as composite image 320. In some cases, the dislocation issue can be a combination of both displacement and rotation, leading to further degradation of the imaging quality.

Among these dislocation issues, displacement can be relatively easily found and corrected. Some embodiments of the present disclosure are directed to a method and a device for correcting the dislocation issues within a polychrome projector, especially due to the rotation issues.

Figure 4A:
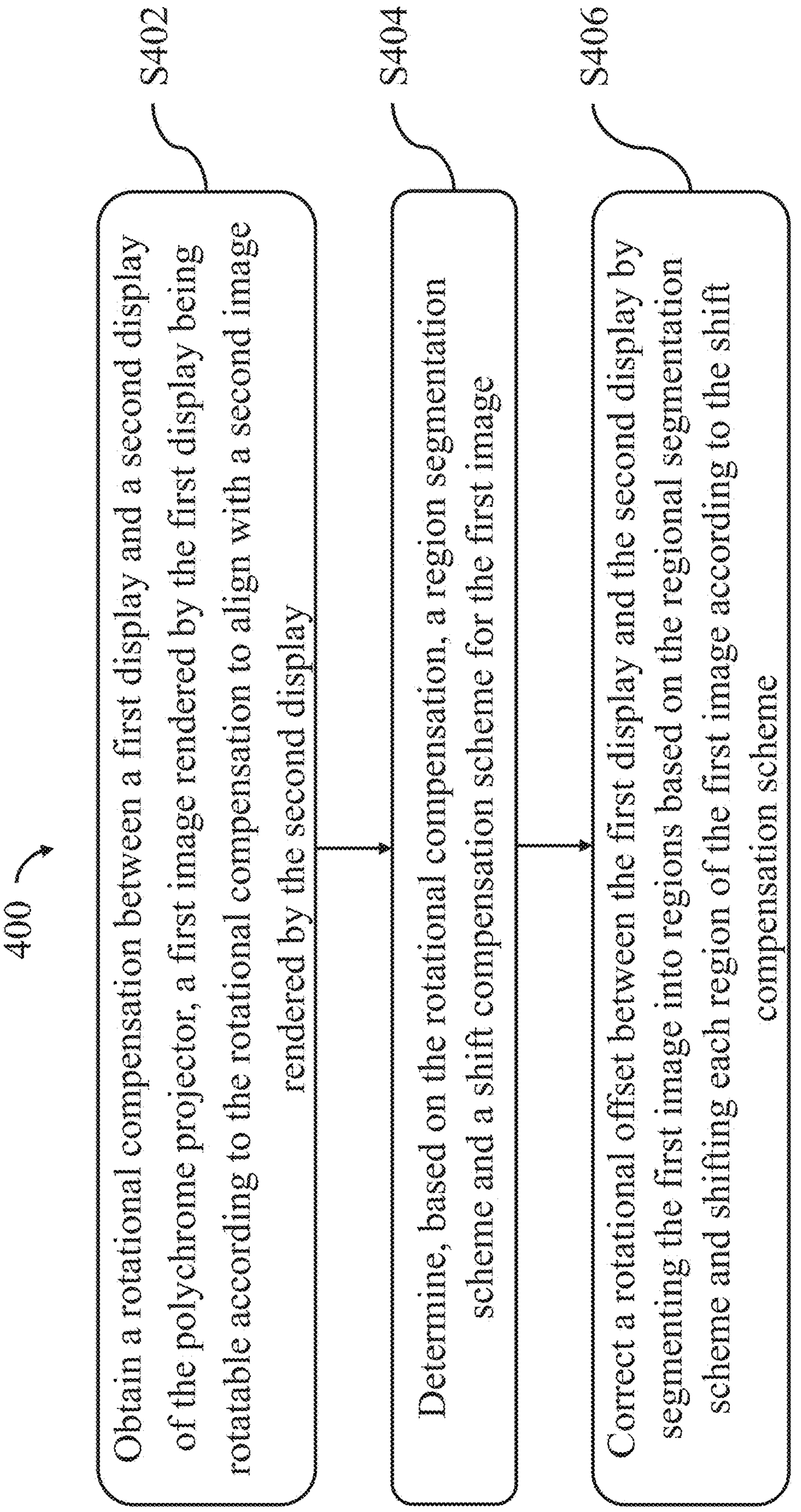
FIG. 4A illustrates a flowchart of an exemplary method for correcting a polychrome projector, according to some embodiments of the present disclosure.

FIG. 4A illustrates a flowchart of an exemplary method 400 for correcting a polychrome projector, according to some embodiments of the present disclosure. The polychrome projector can be embedded in either a VR system or an AR system as described above with reference to FIG. 1. Method 400 includes steps S402 to S406, which can be implemented by an NED (such as NED 100 in FIG. 1 which includes two polychrome projectors 110), specifically by a polychrome projector of the NED (such as polychrome projector 110 in FIG. 1 or polychrome projector 200 in FIG. 2).

At step S402, the NED obtains a rotational compensation between a first display and a second display of the polychrome projector within the NED. A first image rendered by the first display can be rotated according to rotational compensation to align with a second image rendered by the second display. Referring back to FIG. 2, there can be rotational offset between first display 210 and second display 220 of polychrome projector 200, for example resulting in rotational offset between the first and second images respectively rendered thereby. To correct the rotational offset between first display 210 and second display 220, the rotational compensation between first display 210 and second display 220 can be predetermined. In some embodiments, first display 210 (second display 220) can be rotated according to the rotational compensation to align with second display 220 (first display 210) so as to correct the rotational offset therebetween. In some embodiments, the rotational offset can be represented in the form of an angle, while the rotational compensation can be a distance or a number of pixels for images to be rotated towards another one, which is described in detail below.

It is appreciated that method 400 can also be applied between first display 210 and third display 230, or between second display 220 and third display 230 if there is any rotational offset. As also appreciated, one of displays 210, 220, and 230 can be a reference display, and the other two displays can be aligned relative to the reference display. For example, second display 220 can be the reference display and displays 210 and 230 can be aligned relative to a location of first display 220. Specifically, the rotation compensation between first display 210 and second display 220 can be used to align first display 210 with second display 220, and the rotation compensation between second display 220 and third display 230 can be used to align third display 230 with second display 220.

With further reference to FIG. 4A, at step S404, the NED determines a regional segmentation scheme and a shift compensation scheme for the first image based on the rotational compensation.

At step S406, the NED corrects the rotational offset between the first display and the second display by segmenting the first image into regions based on the regional segmentation scheme and shifting each region of the first image according to the shift compensation scheme. The first image is segmented based on the regional segmentation scheme. As previously stated, the NED may obtain the rotational compensation for alignment. Nonetheless, the alignment with the rotational compensation may require significant computational resources and energy consumption, which may be not suitable for NEDs whose computational resources and battery capacity are limited. The shift compensation scheme transforms the alignment process from the level of individual pixels to larger regions, and from rotation to simple lateral shift. As such, method 400 can be implemented with limited resources.

In some embodiments, it is intended to display the first and second images, for which the determined regional segmentation scheme and shift compensation scheme can be used to generate a shifted image of the first image. However, in some embodiments, the first image and the second image are not meant for display. For example, when a viewer desires to perceive a "see through" mode, these images may be generated solely as preparation for a sudden transition to VR mode.

In some embodiments, the NED can retrieve the rotational compensation as an entry, from a plurality of candidate regional segmentation schemes and a plurality of candidate shift compensation schemes, to obtain the regional segmentation scheme and the shift compensation scheme, respectively. The plurality of candidate regional segmentation schemes and the plurality of candidate shift compensation schemes can be predetermined as corresponding to various candidate rotational compensations, as described in detail below.

In some embodiments, the candidate regional segmentation schemes, the candidate shift compensation schemes and candidate rotational compensations can be stored in the memory of the polychrome projector in the form of a look-up table as shown in Table 1. More particularly, each candidate rotational compensation is stored with one of the candidate regional segmentation schemes and one of the shift compensation schemes that correspond to the candidate rotational compensation. In an example, searching the look-up table with the rotational compensation obtained in step S402 as an entry, if the rotational compensation as an entry matches candidate rotational compensation 2, then candidate regional segmentation scheme 2 and candidate shift compensation scheme 2 can be fetched from the memory. As can be appreciated, if there is not a match with any of the candidate rotational compensations in Table 1, the method will not correct the polychrome projector. In some embodiments, the corresponding relationships between the candidate rotational compensations and the candidate regional segmentation schemes (the candidate shift compensations) can be stored in other database forms. First, a search of the database is conducted to determine if any of the stored candidate rotational compensations match the rotational compensation obtained in step S402. If a match is found, then the candidate regional segmentation scheme (the candidate shift compensation) corresponding to the matched rotational compensation can be fetched from the database.

TABLE 1

| | | |
|---|---|---|
| Candidate rotational compensation 1 | Candidate regional segmentation scheme 1 | Candidate shift compensation scheme 1 |
| Candidate rotational compensation 2 | Candidate regional segmentation scheme 2 | Candidate shift compensation scheme 2 |
| Candidate rotational compensation 3 | Candidate regional segmentation scheme 3 | Candidate shift compensation scheme 3 |
| | . . . | |

Figure 4B:
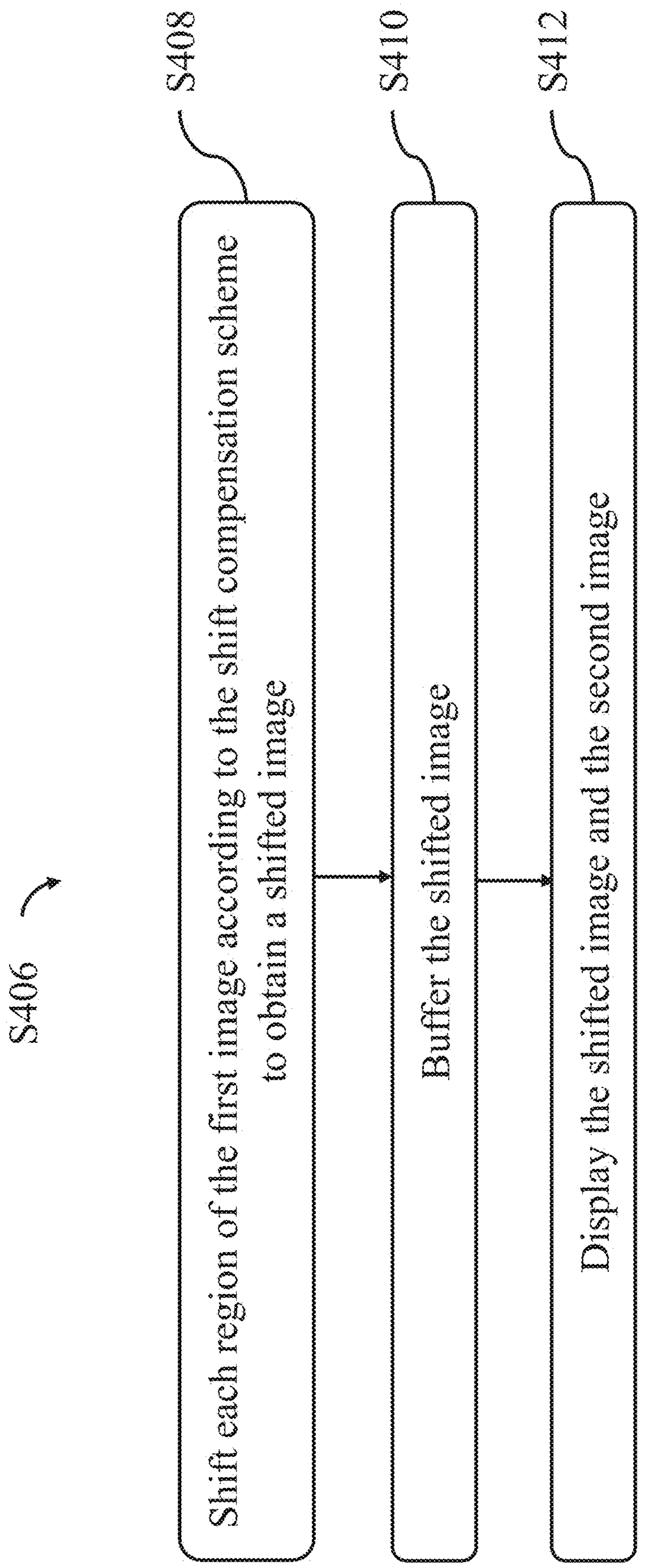
FIG. 4B illustrates sub-steps of an exemplary method for correcting a polychrome projector, according to some embodiments of the present disclosure.

FIG. 4B illustrates sub-steps of exemplary method 400 for correcting a polychrome projector, according to some embodiments of the present disclosure. In some embodiments, the shifted image can be generated via the shift compensation scheme through sub-steps S408 and S410. As shown in FIG. 4B, step S406 includes sub-steps S408 and S410.

At sub-step S408, each region of the first image is shifted according to the shift compensation scheme to obtain the shifted image. In some embodiments, as the regions of the first image may be shifted towards different directions with different displacements, there may be regions that are not covered by the shifted regions in the shifted image. These regions can be "holes" within the shifted image and can be filled with pixels inherited from the first image with the same locations. In some embodiments, each pixel in the gap region can be filled with an average pixel value of pixels adjacent to the pixel, if any.

At sub-step S410, the NED buffers the shifted image. The NED can buffer several shifted images in a timely manner and discard those that have timed out.

As shown in FIG. 4B, step S406 further includes sub-step S412. In some embodiments, at sub-step S412, the NED displays the shifted first image and the second image jointly. As the shifted first image is aligned with the second image, the composite image of the shifted first image and the second image will not suffer from problems such as color casts and edge distortions as described above. As appreciated, the composite image may be composited further with other components in the form of a shifted image aligned with the second image, for example. For a typical polychrome image with three components, there can be two shifted images aligned with the second image that is generated by a reference display. These shifted images along with the second image can be employed in combination to produce a composite image.

Figure 5:
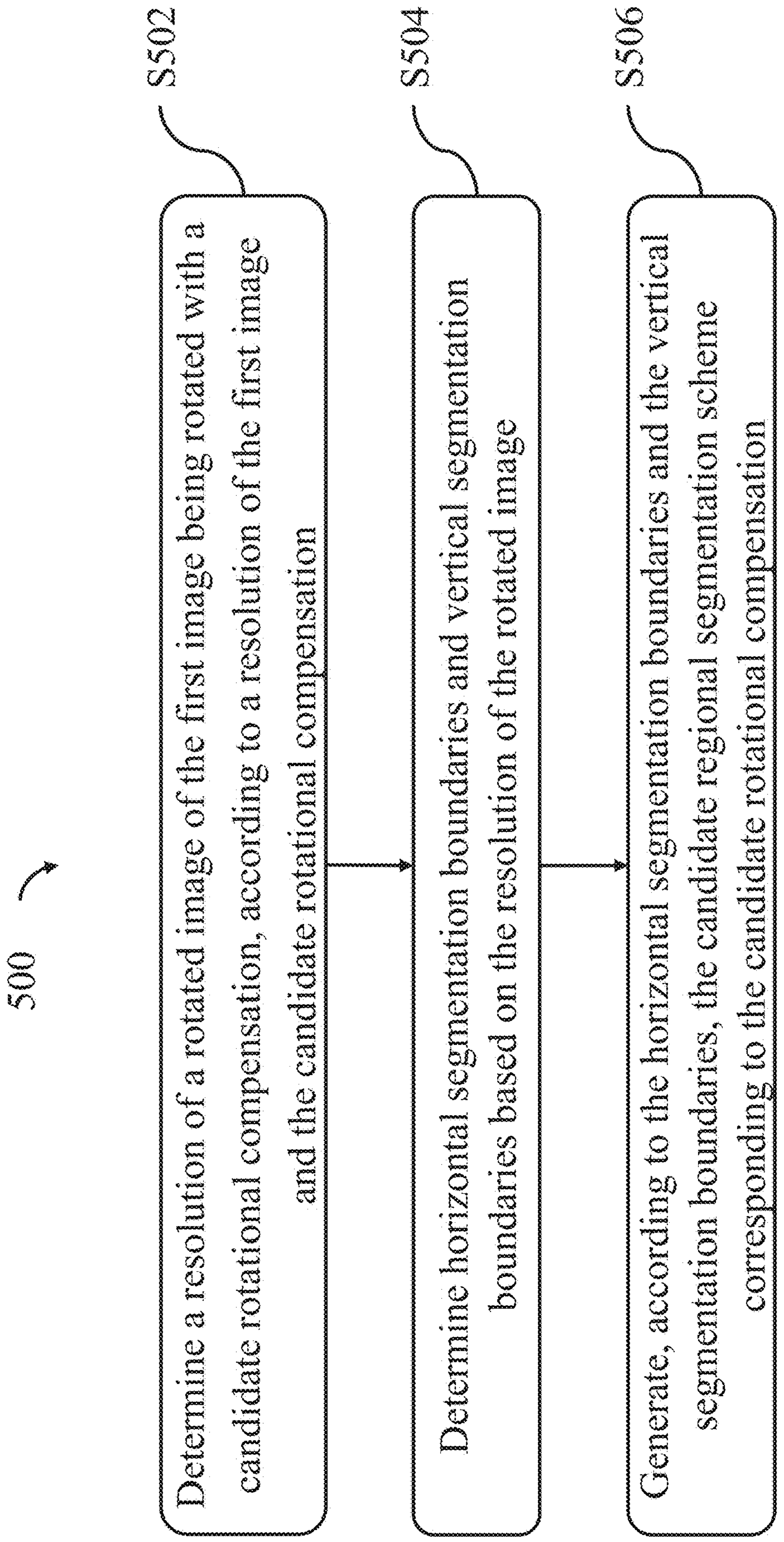
FIG. 5 illustrates a flowchart of an exemplary method for determining a candidate regional segmentation scheme, according to some embodiments of the present disclosure.

FIG. 5 illustrates a flowchart of an exemplary method 500 for determining a candidate regional segmentation scheme, according to some embodiments of the present disclosure. As shown in FIG. 5, method 500 includes steps S502 to S506, which can be implemented by a device for correcting a polychrome projector. In some embodiments, the device for correcting a polychrome projector can be factory-based device used to correct each polychrome projector before shipping or assembling into other apparatus. In some embodiments, the device can be any general-purpose computing device.

At step S502, the device determines a resolution of a rotated image of the first image being rotated with a candidate rotational compensation, according to a resolution of the first image and the candidate rotational compensation. The resolution of the first image (the second image) is preset and determined by the properties of the first display (the second display). When rotated with a candidate rotational compensation, the resolution of the rotated image can be different from the first image. It is appreciated that both the first image and its rotation may not require actual display, allowing for the completion of method 500 as an operation without any visual representation of the images.

Figure 6:
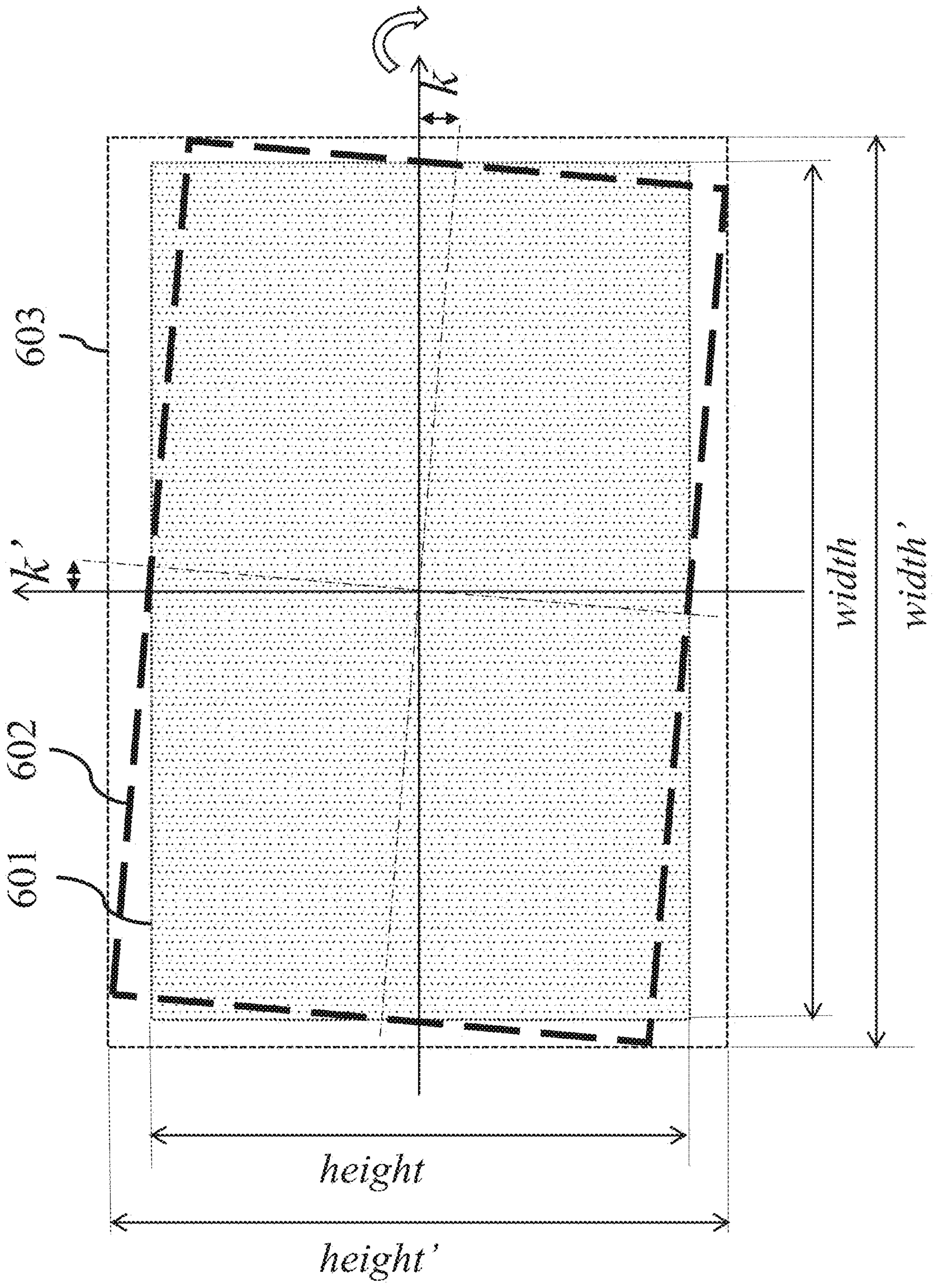
FIG. 6 illustrates an exemplary rotational compensation, according to some embodiments of the present disclosure.

FIG. 6 illustrates an exemplary rotational compensation, according to some embodiments of the present disclosure. As shown in FIG. 6, a first image 601 is rotated with a candidate rotational compensation k to obtain a rotated image 602. In some embodiments, k indicates the number of pixels that can be used to compensate. First image 601 can be represented by a resolution of width*height, which also indicates the number of imaging pixels. Rotational compensation k indicates that the midpoint of the right edge of first image 601 can be rotated by k pixels to reach the midpoint of the right edge of rotated image 602. The midpoint of the upper edge of first image 601 can be rotated by k' pixels (e.g., k' indicates the number of pixels that can be used to compensate) to reach the midpoint of the upper edge of rotated image 602, which can be determined based on the following formula:

$$k' = \text{round}(k * \text{height}/\text{width}) \quad (1)$$

where width and height correspond to first image 601 and round is a rounding operation.

In some embodiments, the rotational compensation can be represented with other forms. For example, the rotational compensation can also be represented by k'.

In some embodiments of the present disclosure, the resolution of the rotated image 602 can be represented by a bounding rectangle 603 that is concentric with first image 601 for calculation convenience. As such, rotated image 602 can be represented with a resolution of width'*height', where width' and height' correspond to bounding rectangle 603. The relationship between width and width' can be based on the following formula:

$$\text{width}' = \text{width} + 2k' \quad (2)$$

In addition, the relationship between height and height' can be based on the following formula:

$$\text{height}' = \text{height} + 2k \quad (3)$$

In some embodiments, the candidate rotational compensation can be selected from a plurality of rotational compensations. The rotational compensations can be determined based on experience. For example, a compensation of at most three to five pixels can be realized in an NED. In some embodiments, the number of the plurality of rotational compensations can be determined based on the resolution of the first image. For example, for a resolution of 640*480 pixels, the number of the rotational compensations can be five. For a resolution greater than 640*480 pixels, the number of the rotational compensations can be more than five. For example, the first image can be rotated with k=−2, −1, 1, and 2 pixels for the resolution of 640*480 pixels. When k<0, it means that the first image is rotated anticlockwise, and when k>0, it means that the first image is rotated clockwise. Each of the candidate rotational compensations −2, −1, 1, and 2 pixels will be considered to determine corresponding candidate regional segmentation schemes.

Referring back to FIG. 5, at step S504, the device determines horizontal segmentation boundaries and vertical segmentation boundaries based on the resolution of the rotated image.

In some embodiments, the number of the horizontal segmentation boundaries can be set according to a magnitude of the candidate rotational compensation. Moreover, the number of the vertical segmentation boundaries can be set according to a magnitude of the candidate rotational compensation as well. In some embodiments, the greater the candidate rotational compensation is, the larger the number of the horizontal segmentation boundaries or the number of the vertical segmentation boundaries can be. A larger candidate rotational compensation indicates a large rotational offset needs to be compensated. In order to mimic the rotational operation through shifting operations more precisely, the first image can be segmented into a greater number of regions.

In some embodiments, for a candidate rotational compensation k, the number of the horizontal segmentation boundaries can be 2*abs(k), and the number of the vertical segmentation boundaries can be 2*abs(k), where abs is the operation to obtain absolute value. The horizontal segmentation boundaries (vertical segmentation boundaries) can be determined to divide the rotated image into equal or substantially equal parts. For example, for a rotated image with the resolution of 640*480 pixels under candidate rotational compensation k=1, the horizontal segmentation boundaries can be determined by dividing 640 by 3. Hence, 213 (≈640÷3) and 427 (≈640÷3×2) pixels can be determined as the horizontal segmentation boundaries used to divide the rotated image into three equal parts. Similarly, the vertical segmentation boundaries can be determined as 160 and 320 pixels by dividing 480 by 3. As can be appreciated, the horizontal segmentation boundaries and vertical segmentation boundaries illustrated here are just for an example and can be determined otherwise.

At step S506, the device generates the candidate regional segmentation scheme, according to the horizontal segmentation boundaries and the vertical segmentation boundaries. The generated candidate regional segmentation scheme corresponds to the candidate rotational compensation and hence can be retrievable by the candidate rotational compensation.

Figure 7:
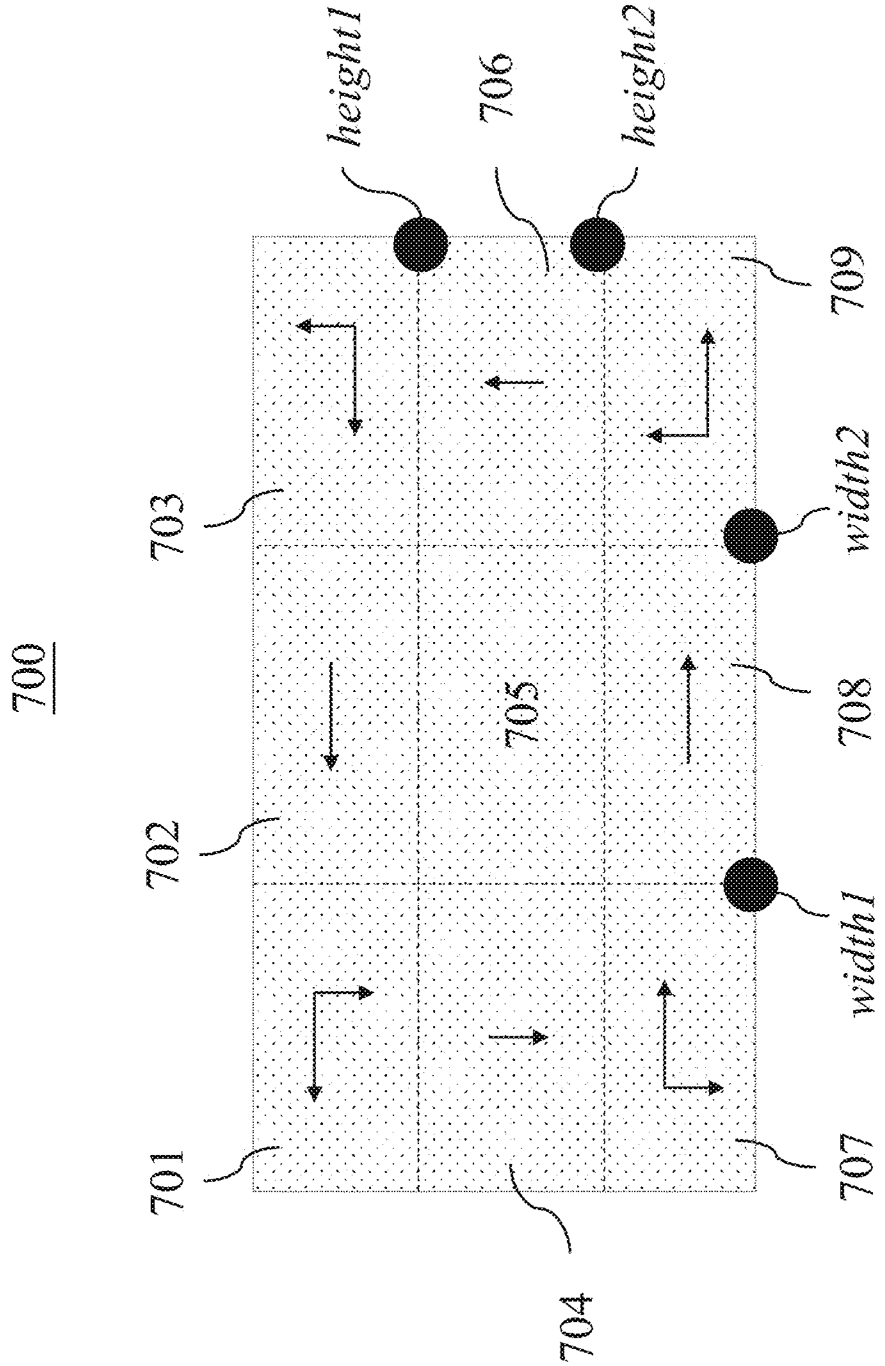
FIG. 7 a schematic diagram of an exemplary candidate regional segmentation scheme, according to some embodiments of the present disclosure.

FIG. 7 a schematic diagram of an exemplary candidate regional segmentation scheme, according to some embodiments of the present disclosure. Continuing with the examples described above, a horizontal segmentation boundary width1 equals 214 pixels, and a horizontal segmentation boundary width2 equals 428 pixels. In addition, a vertical segmentation boundary height1 equals 161 pixels, and a vertical segmentation boundary height2 equals 321 pixels. With these boundaries of the present candidate regional segmentation scheme, a first image 700 can be segmented into nine regions 701, 702, . . . , 709. The present candidate regional segmentation scheme can be stored collectively with candidate rotational compensation k=1 pixel. That is, when retrieved with candidate rotational compensation k=1 pixel, the horizontal segmentation boundaries and the vertical segmentation boundaries indicating the candidate regional segmentation scheme can be obtained.

Figure 8:
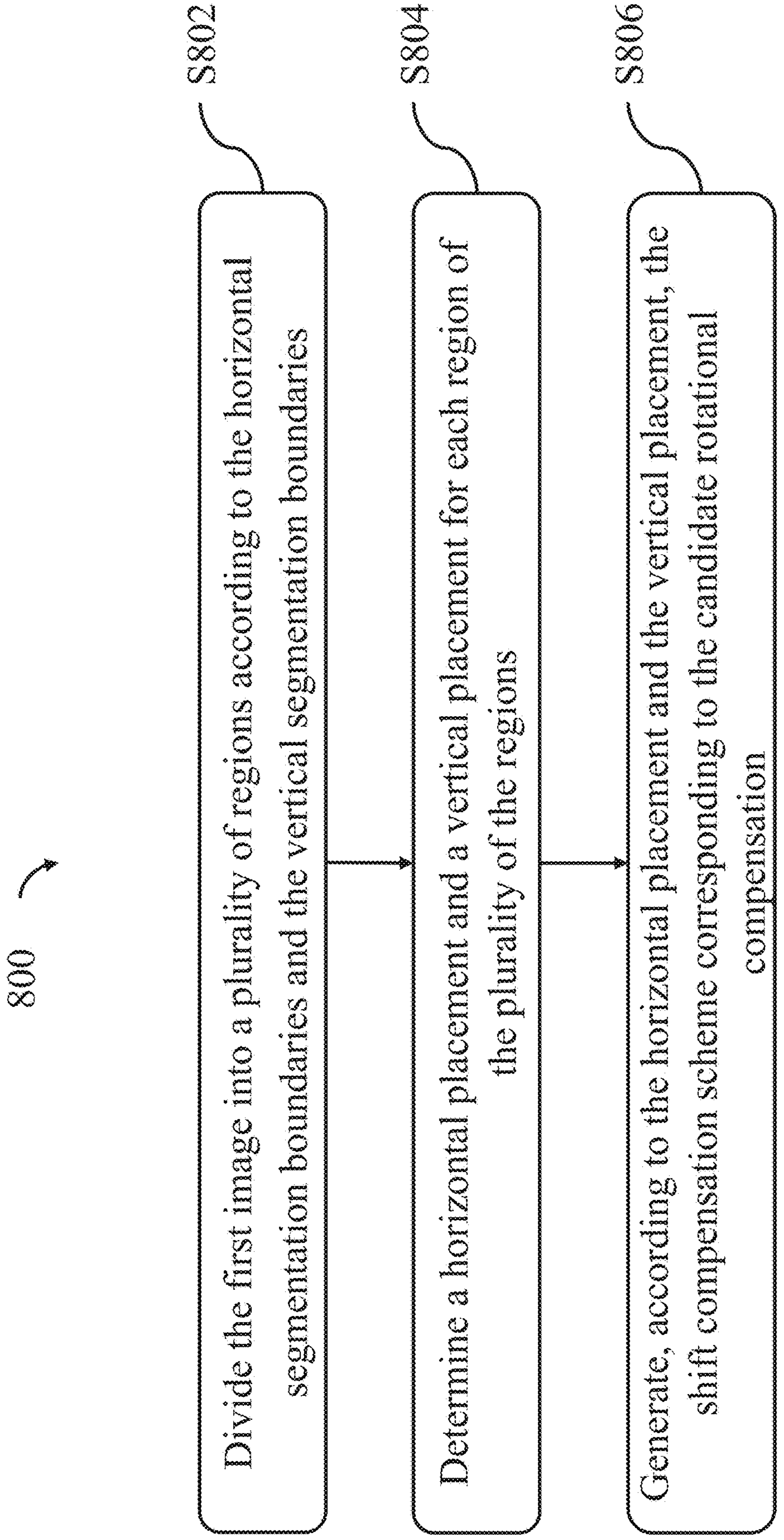
FIG. 8 illustrates a flowchart of an exemplary method for determining a candidate shift compensation scheme, according to some embodiments of the present disclosure.

FIG. 8 illustrates a flowchart of an exemplary method 800 for determining a candidate shift compensation scheme, according to some embodiments of the present disclosure. Method 800 includes steps S802 to S806, which can be implemented by the same device for correcting a polychrome projector as described above.

At step S802, the device divides the first image into a plurality of regions according to the horizontal segmentation boundaries and the vertical segmentation boundaries. As described above in conjunction with FIG. 7, first image 700 can be divided into nine regions 701, 702, 703, . . . , 709 according to horizontal segmentation boundaries width1 and width2, and vertical segmentation boundaries height1 and height2.

At step S804, the device determines a horizontal placement and a vertical placement for each region of the plurality of the regions. With further reference to FIG. 7, respective regions 701, 702, 703, . . . , 709 will be each assigned a corresponding horizontal placement and vertical placement. As appropriate, either or both of the horizontal placement and the vertical placement of some regions can be zero. As shown in FIG. 7, the lines with arrowheads indicate the horizontal placement or the vertical placement, along with their respective orientations. For example, the horizontal placement and the vertical placement for region 705 are zero. Horizontal placements for regions 704 and 706 are zero, while vertical placements for regions 702 and 708 are zero.

In some embodiments, the horizontal placement and the vertical placement for a target region (e.g., region 701, 702, 703, . . . , 708, or 709) of regions 701, 702, 703, . . . , 709 are set according to a location of the target region in first image 700. In some embodiments, in order to mimic the rotational operation via shifting operations more precisely, the closer the target region is to the center of first image 700, the smaller the horizontal placement and the vertical placement for the target region will be. In this regard, region 705 will be the region with the smallest horizontal placement and vertical placement among regions 701, 702, 703, . . . , 709. As described above, in some embodiments, region 705 may not be shifted.

At step S806, the device generates the shift compensation scheme according to the horizontal placement and the vertical placement, which can be retrieved by the candidate rotational compensation.

Figure 9:
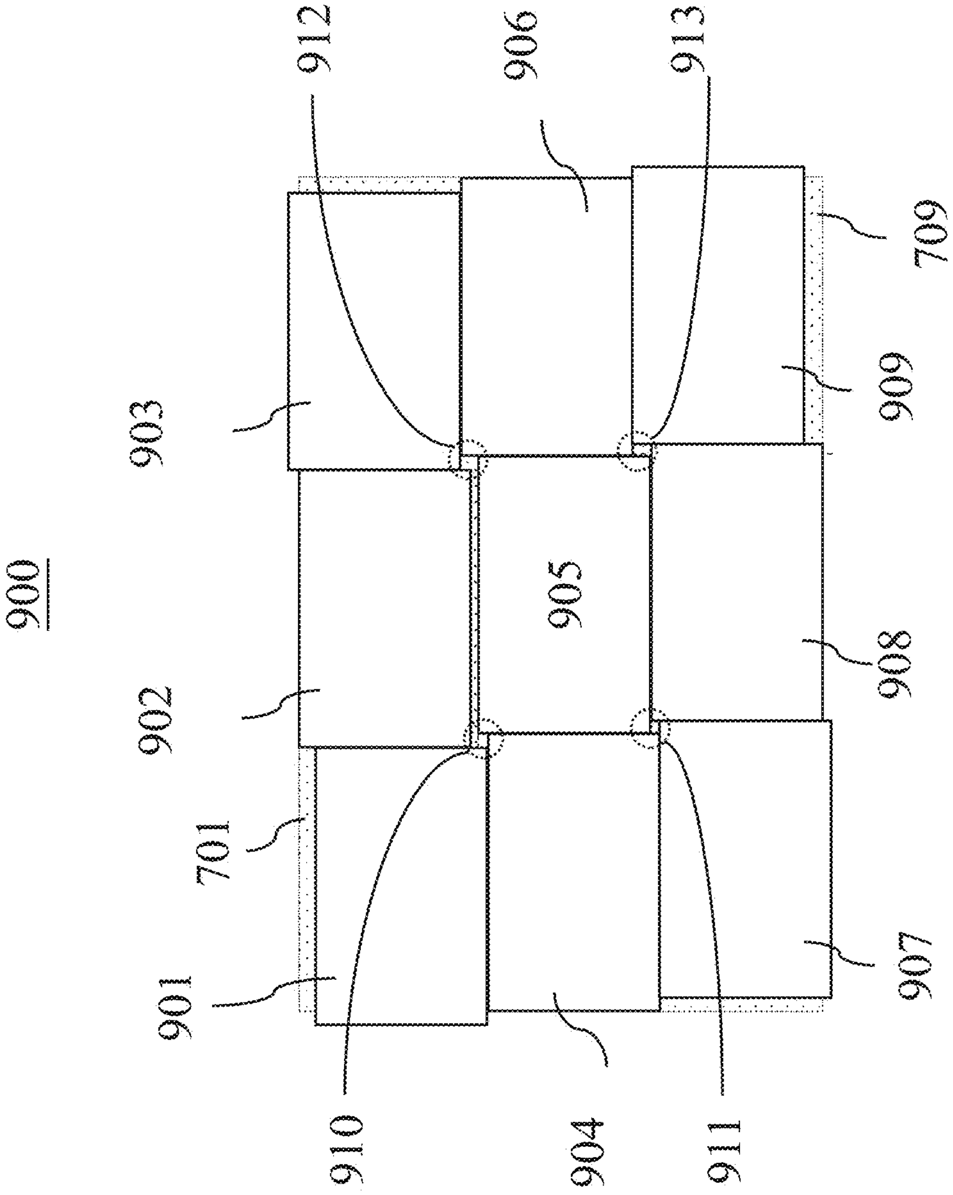
FIG. 9 illustrates an example of a shifted image, according to some embodiments of the present disclosure.

FIG. 9 illustrates an example of a shifted image 900, according to some embodiments of the present disclosure. Referring to FIG. 7 and FIG. 9, a region 901 is shifted from region 701 with the corresponding shift compensation, a region 902 is shifted from region 702 with the corresponding shift compensation, . . . , a region 909 is shifted from region 709 with the corresponding shift compensation. As described above, shifted image 900 can be used to replace first image 700 for displaying. In some embodiments, there may be gap regions 910, 911, 912, and 913 that are not covered by the shifted regions 901 to 909 in shifted image 900. As previously described, these gap regions 910, 911, 912, and 913 can be “holes” within shifted image 900 and can be filled with pixels inherited from first image 700 with the same locations. For example, if region 910 encompasses a pixel positioned at coordinates (214, 161), its corresponding pixel values (such as RGB values) may be derived from the pixel situated at (214, 161) in first image 700. In some embodiments, each pixel in the gap region can be filled with an average pixel value of pixels adjacent to the pixel, if any. For example, pixel values of the pixel positioned at coordinates (214, 161) may be derived from the pixels situated at (213, 160), (213, 161), (213, 162), (214, 160), (214, 162), (215, 160), (215, 161), and (215, 162) in shifted image 900 by calculating the average pixel value thereof.

Figure 10:
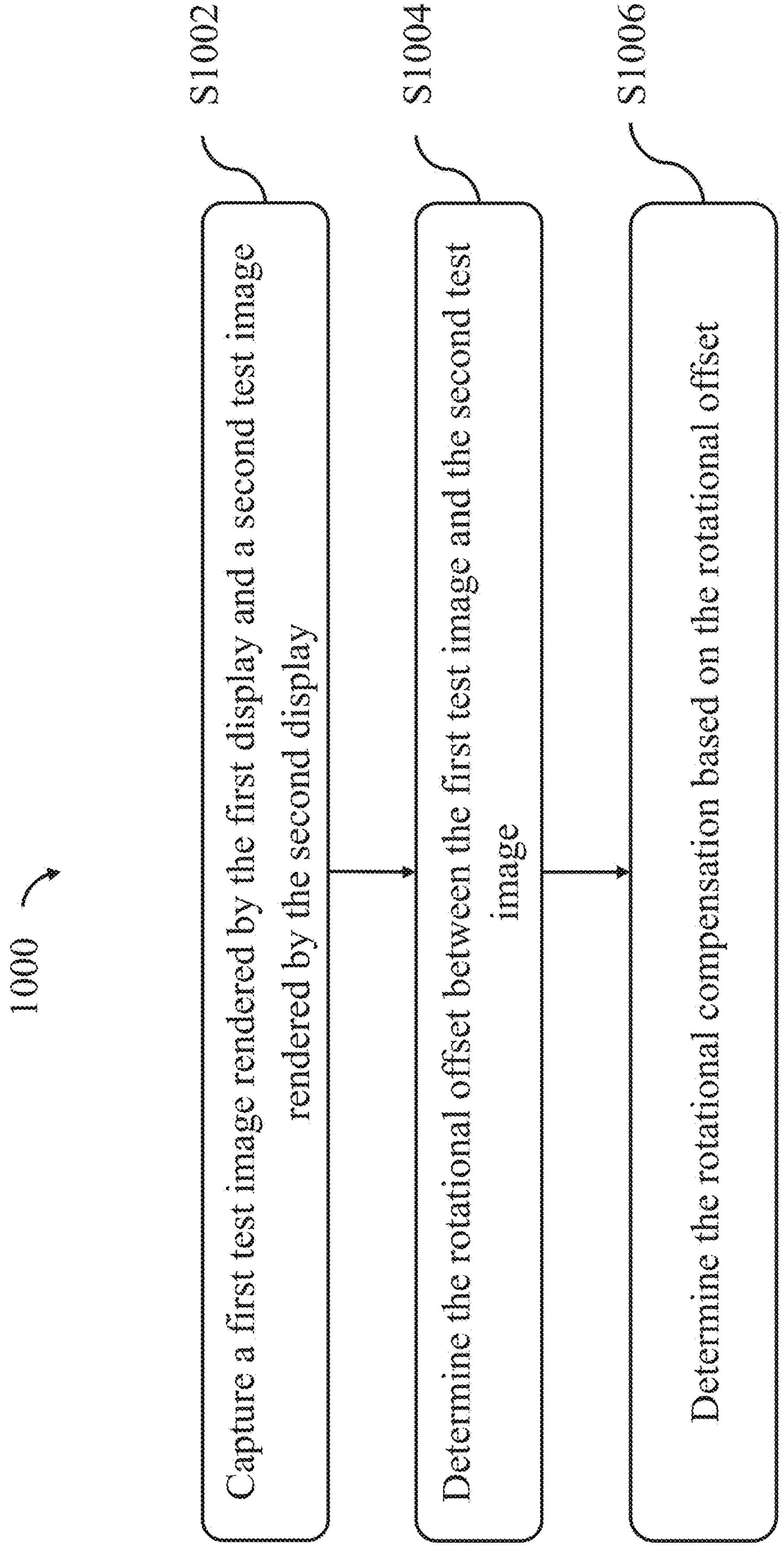
FIG. 10 illustrates a flowchart of an exemplary method for determining a rotational compensation, according to some embodiments of the present disclosure.

FIG. 10 illustrates a flowchart of an exemplary method 1000 for determining a rotational compensation, according to some embodiments of the present disclosure. As shown in FIG. 10, method 1000 includes steps S1002 to S1006, which can be implemented by the device for correcting a polychrome projector as described above.

At step S1002, the device captures a first test image rendered by the first display and a second test image rendered by the second display. The first test image and the second test image can be images filled with solid color or other forms. In some embodiments, the first test image and the second test image can be displayed sequentially, such that the capturing device can distinguish between them. The capturing device can be an image capturing device, included in the device for correcting the polychrome projector, having a higher resolution than either the test first or second image, for example, and equipped with CCD or CMOS elements.

At step S1004, the device determines the rotational offset between the first test image and the second test image. Upon acquiring the first test image and the second test image during step S1002, the device has the capability to scrutinize the structure and positioning of these images by aligning them onto a shared coordinate framework. For example, the first and second test images can be rectangular. Thus, the rotational offset between the first and second test images can be obtained by calculating the angle between their respective symmetry axes.

At step S1006, the device determines the rotational compensation based on the rotational offset. In some embodiments, the first display and the second display may be not designed to process image according to the rotational offset (e.g., an angle). Hence, the rotational compensation provides a parameter that can be processed by the first display and the second display directly.

Figure 11:
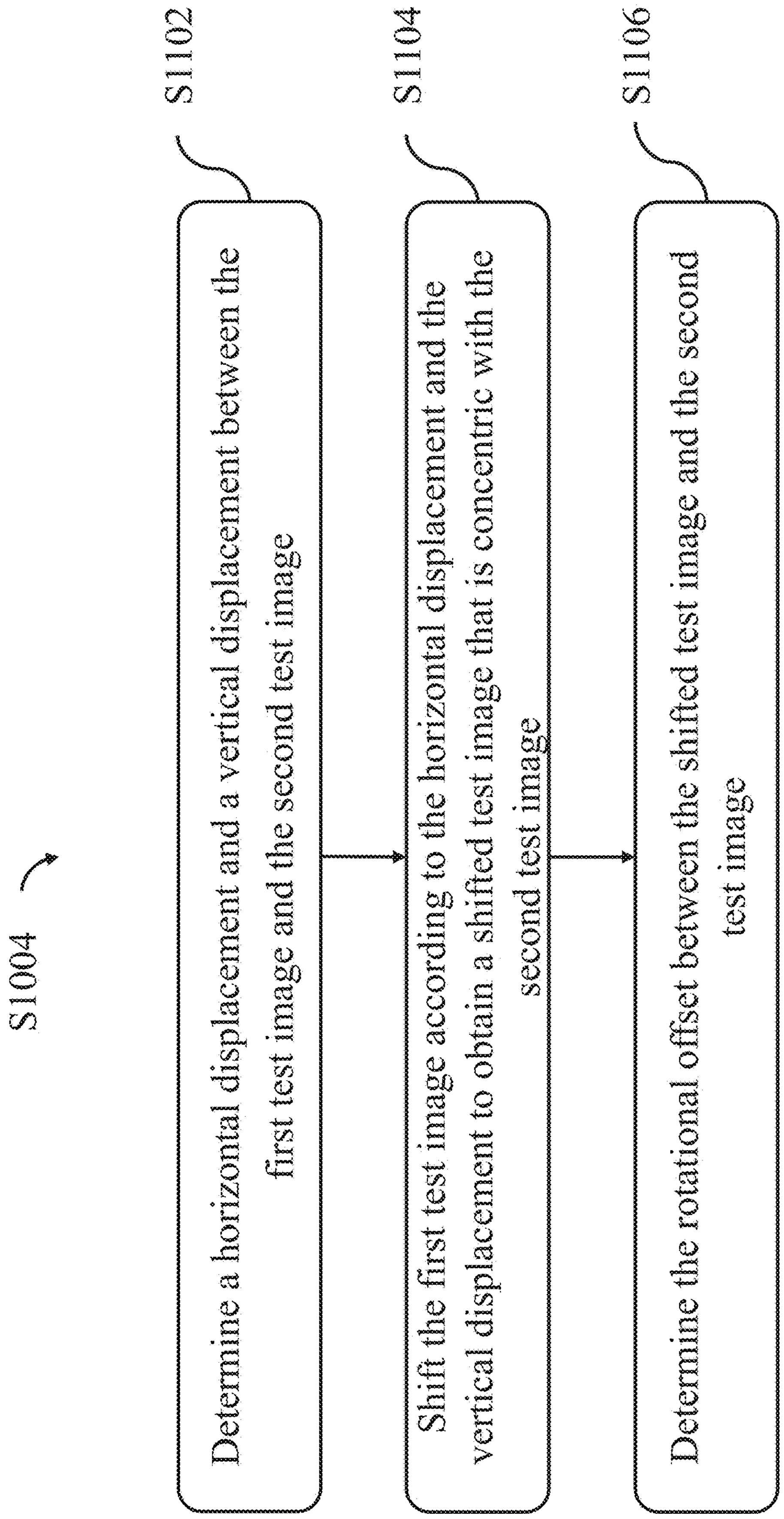
FIG. 11 illustrates sub-steps of an exemplary method for determining a rotational offset, according to some embodiments of the present disclosure.

FIG. 11 illustrates sub-steps of exemplary method 1000 for determining a rotational offset, according to some embodiments of the present disclosure. As shown in FIG. 11, step S1004 includes sub-steps S1102 to S1106.

Figure 12:
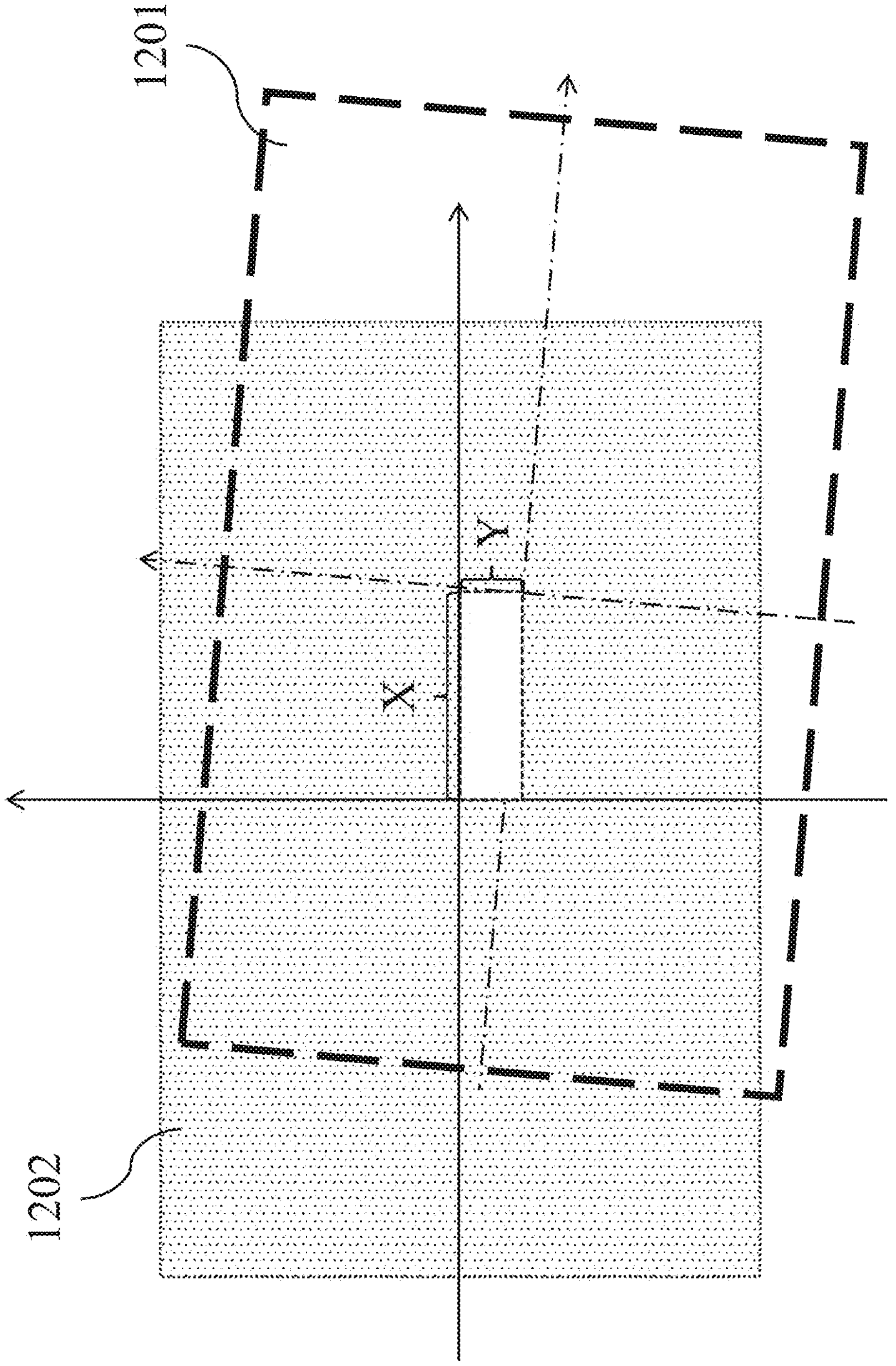
FIG. 12 is a schematic diagram of an example of a horizontal displacement and a vertical displacement, according to some embodiments of the present disclosure.

At sub-step S1102, the device determines a horizontal displacement and a vertical displacement between the first test image and the second test image. FIG. 12 is a schematic diagram of an example of a horizontal displacement X and a vertical displacement Y, according to some embodiments of the present disclosure. As shown in FIG. 12, a first test image 1201 is rotationally offset compared with a second test image 1202 rendered by the reference display. Furthermore, there are horizontal displacement X and vertical displacement Y between first test image 1201 and second test image 1202. Removal of horizontal displacement X and vertical displacement Y aids in determining the rotational offset between first test image 1201 and second test image 1202.

Figure 13:
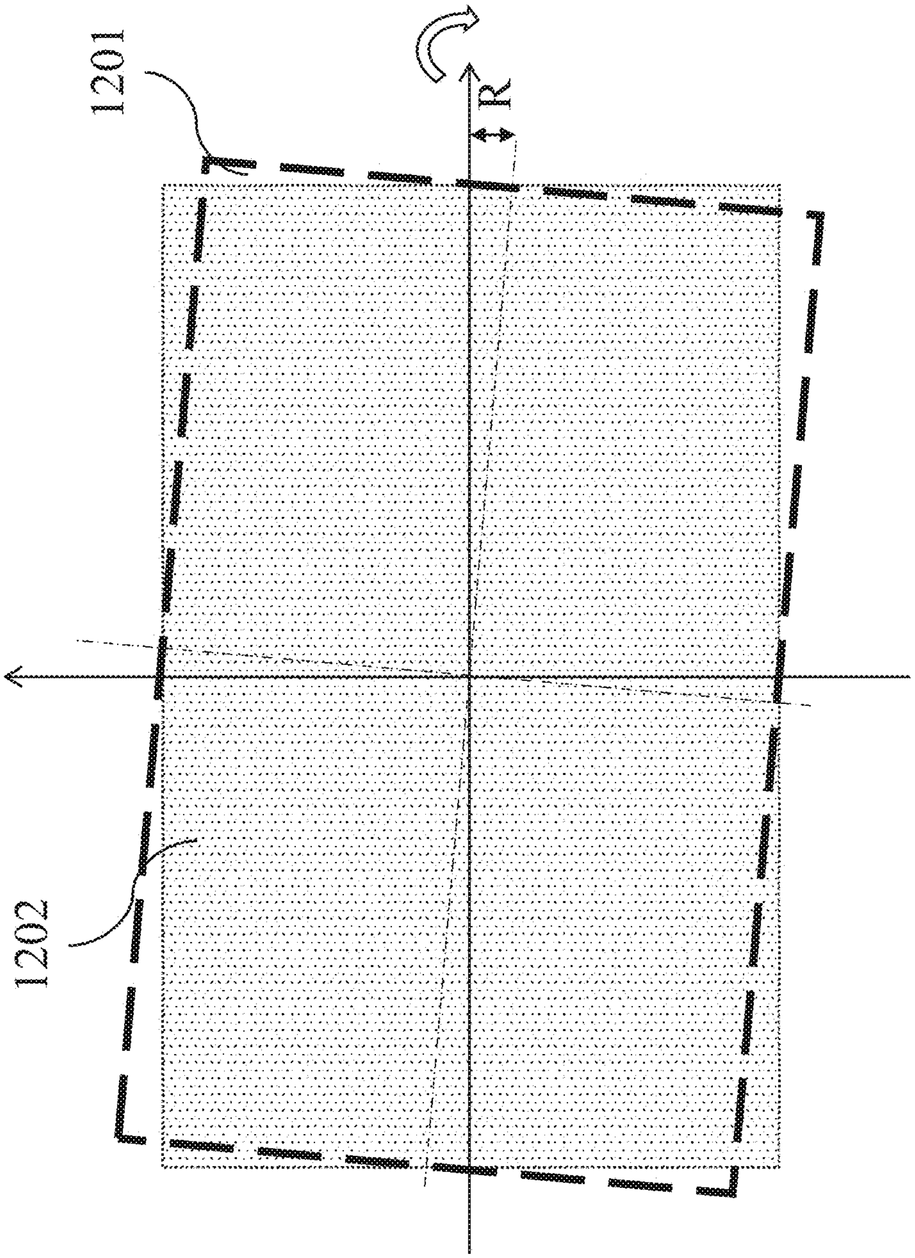
FIG. 13 is a schematic diagram of an example of a rotational offset, according to some embodiments of the present disclosure.

At sub-step S1104, the device shifts first test image 1201 according to the horizontal displacement and the vertical displacement to obtain a shifted test image that is concentric to the second test image 1202. FIG. 13 is a schematic diagram of an example of a rotational offset R, according to some embodiments of the present disclosure. As shown in FIG. 13, first test image 1201 and second test image 1202 are shifted to be concentric with each other. For example, first test image 1201 can be shifted horizontally by horizontal displacement X to the left and shifted upward by vertical displacement Y, while the location of second test image 1202 remains in its original location.

At sub-step S1106, the device determines the rotational offset between the shifted test image and the second test image. With further reference to FIG. 13, the rotational offset R can be determined as the angle between the horizontal symmetry axes between first test image 1201 and second test image 1202, for example. The determined rotational offset R can be utilized to determine the rotational compensation between first test image 1201 and second test image 1202 at sub-step S1006.

According to some embodiments of the present disclosure, images rendered by different displays of a polychrome projector can be aligned through shift operations, which benefits the polychrome projector with limited resources.

Figure 14:
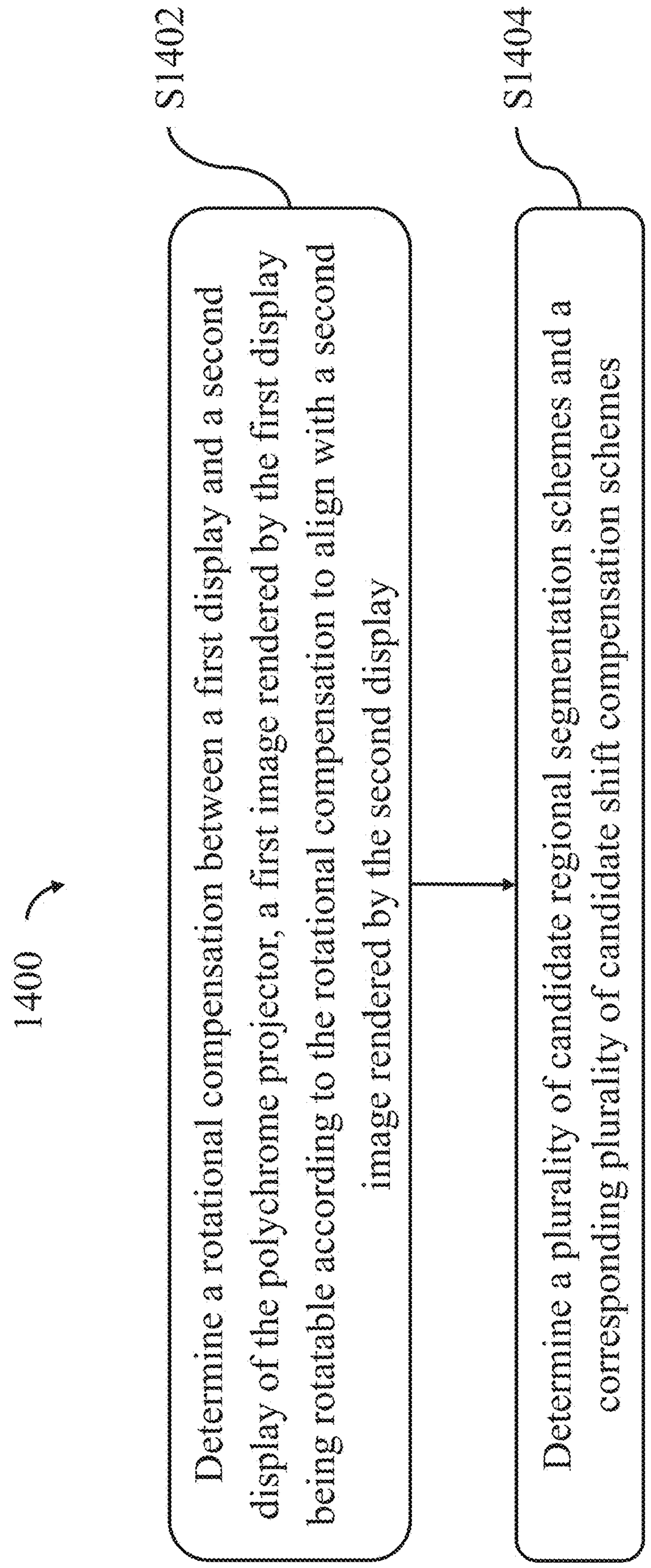
FIG. 14 illustrates a flowchart of an exemplary method for determining a rotational offset, according to some embodiments of the present disclosure.

FIG. 14 illustrates a flowchart of an exemplary method 1400 for determining a rotational offset, according to some embodiments of the present disclosure. As shown in FIG. 14, method 1400 includes steps S1402 and S1404, which can be implemented by a device for correcting a polychrome projector. As described above, in some embodiments, the device for correcting a polychrome projector can be factory-based device used to correct each polychrome projector before shipping or assembling into other apparatus. In some embodiments, the device can be any general-purpose computing device.

At step S1402, the device determines a rotational compensation between a first display and a second display of the polychrome projector, a first image rendered by the first display being rotatable according to the rotational compensation to align with a second image rendered by the second display. The steps of this procedure can be executed by referring to the corresponding preceding explanations and will not be described in detail here.

At step S1404, the device determines a plurality of candidate regional segmentation schemes and a corresponding plurality of candidate shift compensation schemes. The plurality of candidate regional segmentation schemes and the plurality of candidate shift compensation schemes are retrievable with the rotational compensation as an entry, respectively. Each region of the first image segmented based on a retrieved regional segmentation scheme is shiftable according to a retrieved shift compensation scheme to correct a rotational offset between the first display and the second display. The steps of this procedure can be executed by referring to the corresponding preceding explanations and will not be described in detail here.

Figure 15:
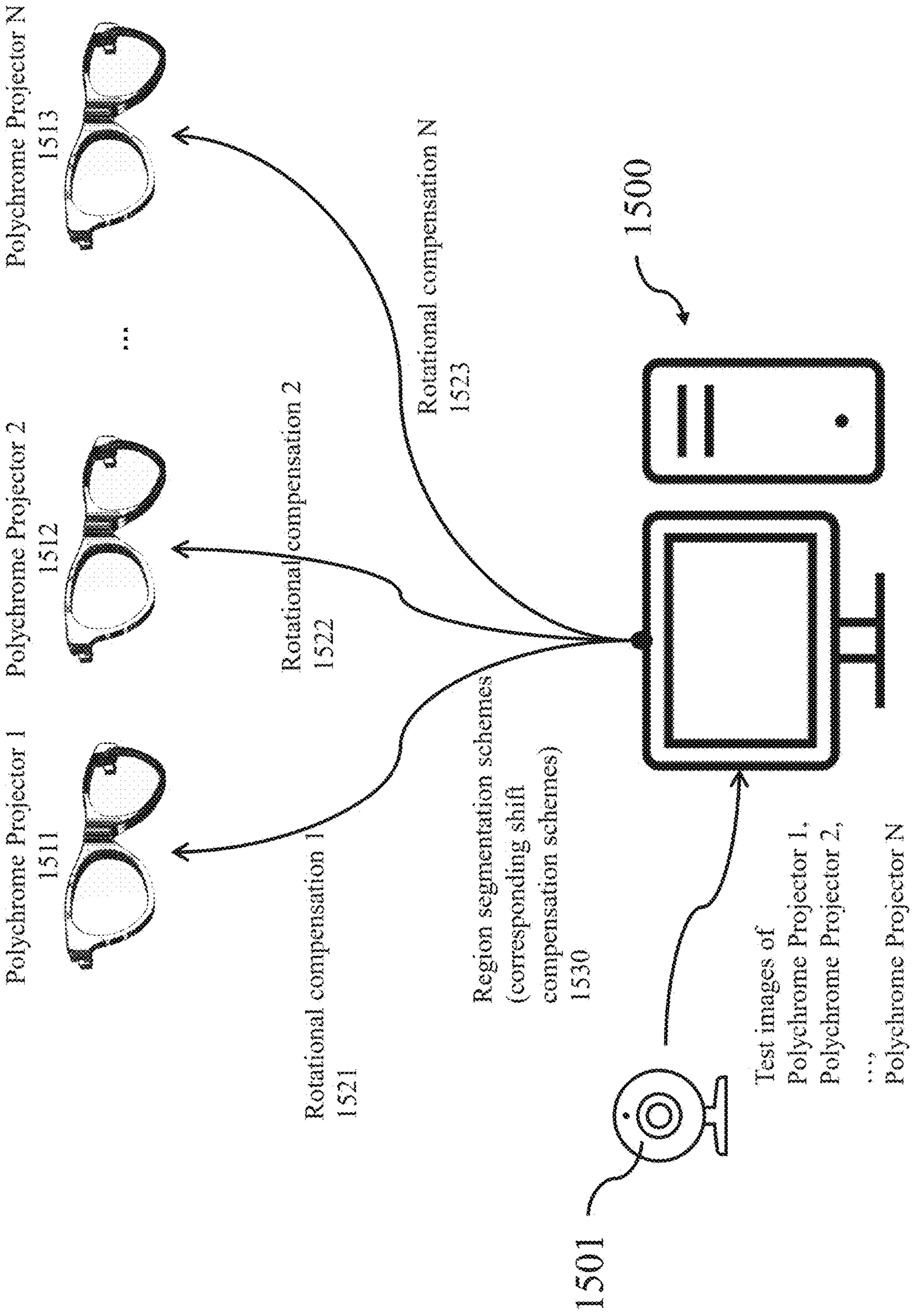
FIG. 15 is a schematic diagram of an exemplary device for correcting a polychrome projector, according to some embodiments of the present disclosure.

FIG. 15 is a schematic diagram of an exemplary device 1500 for correcting a polychrome projector, according to some embodiments of the present disclosure. As shown in FIG. 15, device 1500 may include an image capturing device 1501 that, for example, is equipped with CCD or CMOS elements, as noted above. Moreover, device 1500 may include a memory and one or more processors (not shown). To illustrate the present disclosure's principles, a series of polychrome projectors, specifically polychrome projectors 1511, 1512, . . . , 1513, are shown in FIG. 15.

The memory is configured to store a set of instructions. The one or more processors are configured to execute the set of instructions to cause device 1500 to perform any of the above methods for correcting polychrome projectors 1511, 1512, . . . , and 1513.

Some embodiments of the present disclosure further provide a polychrome projector (e.g., polychrome projector 110 in FIG. 1, polychrome projector 200 in FIG. 2, or any of polychrome projectors 1511, 1512, . . . , 1513 in FIG. 15). The polychrome projector includes a memory and one or more processors. The memory is configured to store a rotational compensation and a set of instructions. The one or more processors are configured to execute the set of instructions to cause the polychrome projector to perform any of the above methods for correcting the polychrome projectors.

Image capturing device 1501 is capable of capturing test images produced by polychrome projectors 1511, 1512, . . . , 1513, and subsequently transmitting them to the one or more processors of device 1500 for further processing. In some embodiments, these projectors are of the same model type and exhibit identical resolution characteristics. Accordingly, common region segmentation and corresponding shift compensation schemes may be evenly distributed among all polychrome projectors 1511, 1512, . . . , 1513. On the other hand, rotational compensations 1521, 1522, . . . , 1523 may be determined based on the test images produced by the respective polychrome projectors 1511, 1512, . . . , 1513. Subsequently, rotational compensation 1521, 1522, . . . , or 1523 may be sent to their corresponding polychrome projector 1511, 1512, . . . , or 1513, to be stored for future use.

Some embodiments of the present disclosure further provide a non-transitory computer-readable storage medium storing a set of instructions that are executable by one or more processors of a device to cause the device to perform any of the above-mentioned methods for correcting nonuniformity of an NED.

Figure 16:
FIG. 16 shows exemplary images rendered by a polychrome projector before and after correction.

FIG. 16 shows exemplary images rendered by a polychrome projector before and after correction. As shown in FIG. 16, composite images 1601 and 1602 are composites of three different images with respective color components. The images used to composite image 1601 may be rotationally offset therebetween which leads to the presence of undesired color casts and edge distortions in the final output. On the other hand, composite image 1602 is produced after aligning the images used to create it, and as a result, the corrected polychrome projector can render it with precision and without any unwanted color casts or edge distortions.

It should be noted that relational terms herein such as “first” and “second” are used only to differentiate an entity or operation from another entity or operation, and do not require or imply any actual relationship or sequence between these entities or operations. Moreover, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequences of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for correcting a micro polychrome light emitting device, comprising:

obtaining a rotational compensation between a first display and a second display of the micro polychrome light emitting device, a first image rendered by the first display being rotatable according to the rotational compensation to align with a second image rendered by the second display;

determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

2. The method according to claim 1, wherein correcting the rotational offset between the first display and the second display comprises:

shifting each of the regions of the first image according to the shift compensation scheme to obtain a shifted image; and buffering the shifted image.

3. The method according to claim 2, wherein the shifted image comprises a gap region between adjacent shifted regions, and correcting the rotational offset further includes:

filling the gap region with pixels inherited from the first image with same locations; or filling a pixel in the gap region with an average pixel value of pixels adjacent to the pixel.

4. The method according to claim 2, wherein correcting the rotational offset between the first display and the second display further comprises: displaying the shifted image and the second image.

5. The method according to claim 1, wherein the rotational compensation is obtained by operations comprising:

capturing a first test image rendered by the first display and a second test image rendered by the second display;

determining the rotational offset between the first test image and the second test image; and determining the rotational compensation based on the rotational offset.

6. The method according to claim 5, wherein determining the rotational offset between the first test image and the second test image comprises:

determining a horizontal displacement and a vertical displacement between the first test image and the second test image;

shifting the first test image according to the horizontal displacement and the vertical displacement to obtain a shifted test image that is concentric with the second test image; and determining the rotational offset between the shifted test image and the second test image.

7. The method according to claim 1, wherein determining the regional segmentation scheme and the shift compensation scheme comprises:

retrieving from a stored look-up table with the rotational compensation as an entry, from a plurality of candidate regional segmentation schemes and a plurality of candidate shift compensation schemes, the regional segmentation scheme and the shift compensation scheme, respectively.

8. The method according to claim 7, wherein each of the plurality of candidate regional segmentation schemes is predetermined by operations comprising:

determining a resolution of a rotated image of the first image being rotated with a candidate rotational compensation, according to a resolution of the first image and the candidate rotational compensation;

determining horizontal segmentation boundaries and vertical segmentation boundaries based on the resolution of the rotated image; and generating, according to the horizontal segmentation boundaries and the vertical segmentation boundaries, the candidate regional segmentation scheme corresponding to the candidate rotational compensation.

9. The method according to claim 8, wherein each of the plurality of candidate shift compensation schemes is predetermined by operations comprising:

dividing the first image into a plurality of regions according to the horizontal segmentation boundaries and the vertical segmentation boundaries;

determining a horizontal placement and a vertical placement for each region of the plurality of the regions; and generating, according to the horizontal placement and the vertical placement, the shift compensation scheme corresponding to the candidate rotational compensation.

10. The method according to claim 8, wherein a first number of the horizontal segmentation boundaries and a second number of the vertical segmentation boundaries are set according to a magnitude of the candidate rotational compensation.

11. The method according to claim 10, wherein the first number or the second number is proportional to the candidate rotational compensation.

12. The method according to claim 9, wherein the horizontal placement and the vertical placement for a target region of the plurality of the regions are set according to a location of the target region in the first image.

13. The method according to claim 12, wherein the horizontal placement or the vertical placement for the target region is proportional to a distance between the target region and the center of the first image.

14. The method according to claim 8, wherein the candidate rotational compensation is selected from a plurality of rotational compensations whose number is determined based on the resolution of the first image.

15. A method for correcting a micro polychrome light emitting device, comprising:

determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a respectively corresponding plurality of candidate shift compensation schemes, wherein the plurality of candidate regional segmentation schemes and the plurality of candidate shift compensation schemes are fetchable according to the rotational compensation, respectively, and wherein each region of the first image segmented based on a fetched regional segmentation scheme is shiftable according to a fetched shift compensation scheme to correct a rotational offset between the first display and the second display.

16. The method according to claim 15, wherein determining the rotational compensation comprises:

capturing a first test image rendered by the first display and a second test image rendered by the second display;

determining the rotational offset between the first test image and the second test image; and determining the rotational compensation based on the rotational offset.

17. The method according to claim 16, wherein determining the rotational offset between the first test image and the second test image comprises:

determining a horizontal displacement and a vertical displacement between the first test image and the second test image;

shifting the first test image according to the horizontal displacement and the vertical displacement to obtain a shifted test image that is concentric with the second test image; and determining the rotational offset between the shifted test image and the second test image.

18. The method according to claim 15, wherein determining the plurality of candidate regional segmentation schemes comprises, for each of the plurality of candidate regional segmentation schemes:

determining a resolution of a rotated image of the first image being rotated with a candidate rotational compensation, according to a resolution of the first image and the candidate rotational compensation;

determining horizontal segmentation boundaries and vertical segmentation boundaries based on the resolution of the rotated image; and generating, according to the horizontal segmentation boundaries and the vertical segmentation boundaries, the candidate regional segmentation scheme corresponding to the candidate rotational compensation.

19. The method according to claim 18, wherein determining the plurality of candidate shift compensation schemes comprises, for each of the plurality of candidate shift compensation schemes:

dividing the first image into a plurality of regions according to the horizontal segmentation boundaries and the vertical segmentation boundaries;

determining a horizontal placement and a vertical placement for each region of the plurality of the regions; and generating, according to the horizontal placement and the vertical placement, the shift compensation scheme corresponding to the candidate rotational compensation.

20. The method according to claim 18, wherein a first number of the horizontal segmentation boundaries and a second number of the vertical segmentation boundaries are set according to a magnitude of the candidate rotational compensation.

21. The method according to claim 20, wherein the first number or the second number is proportional to the candidate rotational compensation.

22. The method according to claim 19, wherein the horizontal placement and the vertical placement for a target region of the plurality of the regions are set according to a location of the target region in the first image.

23. The method according to claim 22, wherein the horizontal placement or the vertical placement for the target region is proportional to a distance between the target region and the center of the first image.

24. The method according to claim 18, wherein the candidate rotational compensation is selected from a plurality of rotational compensations whose number is determined based on the resolution of the first image.

25. A micro polychrome light emitting device, comprising:

a memory configured to store a rotational compensation and a set of instructions; and one or more processors configured to execute the set of instructions to cause the micro polychrome light emitting device to perform operations comprising:

obtaining a rotational compensation between a first display and a second display of the micro polychrome light emitting device, a first image rendered by the first display being rotatable according to the rotational compensation to align with a second image rendered by the second display;

determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

26. The micro polychrome light emitting device according to claim 25, wherein correcting the rotational offset between the first display and the second display comprises:

shifting each of the regions of the first image according to the shift compensation scheme to obtain a shifted image; and buffering the shifted image.

27. The micro polychrome light emitting device according to claim 26, wherein the shifted image comprises a gap region between adjacent shifted regions, and correcting the rotational offset further comprises filling the gap region with pixels inherited from the first image with same locations, or filling a pixel in the gap region with an average pixel value of pixels adjacent to the pixel.

28. The micro polychrome light emitting device according to claim 26, wherein correcting the rotational offset between the first display and the second display further comprises:

displaying the shifted image and the second image.

29. The micro polychrome light emitting device according to claim 25, wherein the rotational compensation is obtained by operations comprising:

capturing a first test image rendered by the first display and a second test image rendered by the second display;

determining the rotational offset between the first test image and the second test image; and determining the rotational compensation based on the rotational offset.

30. The micro polychrome light emitting device according to claim 29, wherein determining the rotational offset between the first test image and the second test image comprises:

determining a horizontal displacement and a vertical displacement between the first test image and the second test image;

shifting the first test image according to the horizontal displacement and the vertical displacement to obtain a shifted test image that is concentric with the second test image; and determining the rotational offset between the shifted test image and the second test image.

31. The micro polychrome light emitting device according to claim 25, wherein the memory is further configured to store a plurality of candidate regional segmentation schemes and a plurality of candidate shift compensation schemes in a look-up table, and determining the regional segmentation scheme and the shift compensation scheme comprises:

retrieving from the look-up table with the rotational compensation as an entry, from the plurality of candidate regional segmentation schemes and the plurality of candidate shift compensation schemes, to obtain the regional segmentation scheme and the shift compensation scheme, respectively.

32. The micro polychrome light emitting device according to claim 31, wherein each of the plurality of candidate regional segmentation schemes is predetermined by operations comprising:

determining a resolution of a rotated image of the first image being rotated with a candidate rotational compensation, according to a resolution of the first image and the candidate rotational compensation;

determining horizontal segmentation boundaries and vertical segmentation boundaries based on the resolution of the rotated image; and generating, according to the horizontal segmentation boundaries and the vertical segmentation boundaries, the candidate regional segmentation scheme corresponding to the candidate rotational compensation.

33. The micro polychrome light emitting device according to claim 32, wherein each of the plurality of candidate shift compensation schemes is predetermined by operations comprising:

dividing the first image into a plurality of regions according to the horizontal segmentation boundaries and the vertical segmentation boundaries;

determining a horizontal placement and a vertical placement for each region of the plurality of the regions; and generating, according to the horizontal placement and the vertical placement, the shift compensation scheme corresponding to the candidate rotational compensation.

34. The micro polychrome light emitting device according to claim 32, wherein a first number of the horizontal segmentation boundaries and a second number of the vertical segmentation boundaries are set according to a magnitude of the candidate rotational compensation.

35. The micro polychrome light emitting device according to claim 34, wherein the first number or the second number is proportional to the candidate rotational compensation.

36. The micro polychrome light emitting device according to claim 33, wherein the horizontal placement and the vertical placement for a target region of the plurality of the regions are set according to a location of the target region in the first image.

37. The micro polychrome light emitting device according to claim 36, wherein the horizontal placement or the vertical placement for the target region is proportional to a distance between the target region and the center of the first image.

38. The micro polychrome light emitting device according to claim 32, wherein the candidate rotational compensation is selected from a plurality of rotational compensations whose number is determined based on the resolution of the first image.

39. A device for correcting a micro polychrome light emitting device, comprising:

a memory configured to store a set of instructions; and one or more processors configured to execute the set of instructions to cause the device to perform operations comprising:

determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a respectively corresponding plurality of candidate shift compensation schemes, wherein the plurality of candidate regional segmentation schemes and the plurality of candidate shift compensation schemes are fetchable according to the rotational compensation, respectively, and wherein each region of the first image segmented based on a fetched regional segmentation scheme is shiftable according to a fetched shift compensation scheme to correct a rotational offset between the first display and the second display.

40. The device according to claim 39, the device further comprising an image capturing device, wherein determining the rotational compensation comprises:

capturing a first test image rendered by the first display and a second test image rendered by the second display via the image capturing device;

determining the rotational offset between the first test image and the second test image; and determining the rotational compensation based on the rotational offset.

41. The device according to claim 40, wherein determining the rotational offset between the first test image and the second test image comprises:

determining a horizontal displacement and a vertical displacement between the first test image and the second test image;

shifting the first test image according to the horizontal displacement and the vertical displacement to obtain a shifted test image that is concentric with the second test image; and determining the rotational offset between the shifted test image and the second test image.

42. The device according to claim 39, wherein determining the plurality of candidate regional segmentation schemes comprises, for each of the plurality of candidate regional segmentation schemes:

determining a resolution of a rotated image of the first image being rotated with a candidate rotational compensation, according to a resolution of the first image and the candidate rotational compensation;

determining horizontal segmentation boundaries and vertical segmentation boundaries based on the resolution of the rotated image; and generating, according to the horizontal segmentation boundaries and the vertical segmentation boundaries, the candidate regional segmentation scheme corresponding to the candidate rotational compensation.

43. The device according to claim 42, wherein determining the plurality of candidate shift compensation schemes comprises, for each of the plurality of candidate shift compensation schemes:

dividing the first image into a plurality of regions according to the horizontal segmentation boundaries and the vertical segmentation boundaries;

determining a horizontal placement and a vertical placement for each region of the plurality of the regions; and generating, according to the horizontal placement and the vertical placement, the shift compensation scheme corresponding to the candidate rotational compensation.

44. The device according to claim 42, wherein a first number of the horizontal segmentation boundaries and a second number of the vertical segmentation boundaries are set according to a magnitude of the candidate rotational compensation.

45. The device according to claim 44, wherein the first number or the second number is proportional to the candidate rotational compensation.

46. The device according to claim 43, wherein the horizontal placement and the vertical placement for a target region of the plurality of the regions are set according to a location of the target region in the first image.

47. The device according to claim 46, wherein the horizontal placement or the vertical placement for the target region is proportional to a distance between the target region and the center of the first image.

48. The device according to claim 42, wherein the candidate rotational compensation is selected from a plurality of rotational compensations whose number is determined based on the resolution of the first image.

49. A non-transitory computer-readable storage medium, storing a set of instructions that are executable by one or more processors of a device to cause the device to perform operations for correcting a micro polychrome light emitting device, the operations comprising:

obtaining a rotational compensation between a first display and a second display of the micro polychrome light emitting device, a first image rendered by the first display being rotatable according to the rotational compensation to align with a second image rendered by the second display;

determining, based on the rotational compensation, a regional segmentation scheme and a shift compensation scheme for the first image; and correcting a rotational offset between the first display and the second display by segmenting the first image into regions based on the regional segmentation scheme and shifting each of the regions of the first image according to the shift compensation scheme.

50. A non-transitory computer-readable storage medium, storing a set of instructions that are executable by one or more processors of a device to cause the device to perform operations for correcting a micro polychrome light emitting device, the operations comprising:

determining a rotational compensation between a first display and a second display of the micro polychrome light emitting device, a first image rendered by the first display being rotatable according to the rotational compensation to align with a second image rendered by the second display; and determining a plurality of candidate regional segmentation schemes and a respectively corresponding plurality of candidate shift compensation schemes, wherein the plurality of candidate regional segmentation schemes and the plurality of candidate shift compensation schemes are fetchable according to the rotational compensation, respectively, and wherein each region of the first image segmented based on a fetched regional segmentation scheme is shiftable according to a fetched shift compensation scheme to correct a rotational offset between the first display and the second display.

* * * * *